(12) United States Patent
Neumeier et al.

(10) Patent No.: US 10,065,279 B2
(45) Date of Patent: Sep. 4, 2018

(54) HIGH SPEED BOLT DISPENSER

(71) Applicant: HONDA MOTOR CO., LTD., Minato-ku, Tokyo (JP)

(72) Inventors: Samuel J. Neumeier, Troy, OH (US); Ryan M. Johnson, Anna, OH (US); Joseph E. Dukehart, Elida, OH (US); Kurt Ehemann, Anna, OH (US); Chris Evers, New Bremen, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 15/009,639

(22) Filed: Jan. 28, 2016

(65) Prior Publication Data
US 2016/0144469 A1    May 26, 2016

Related U.S. Application Data

(62) Division of application No. 13/618,254, filed on Sep. 14, 2012, now Pat. No. 9,278,798.

(51) Int. Cl.
*B23P 19/00*    (2006.01)
*B65D 83/02*    (2006.01)

(52) U.S. Cl.
CPC .......... *B23P 19/001* (2013.01); *B23P 19/003* (2013.01); *B65D 83/02* (2013.01)

(58) Field of Classification Search
CPC ............................... B23P 19/001; B65D 83/02
USPC .......................................................... 227/45
See application file for complete search history.

(56) References Cited

U.S. PATENT DOCUMENTS

| | | |
|---|---|---|
| 1,980,967 A | 11/1934 | De Mooy |
| 3,554,403 A | 1/1971 | Ginther |
| 3,734,377 A | 5/1973 | Munn |
| 3,838,716 A | 10/1974 | Ripple et al. |
| 3,946,926 A | 3/1976 | Willis |
| 4,180,195 A | 12/1979 | Caley et al. |
| 4,208,153 A | 6/1980 | Trethewy |
| 4,220,275 A | 9/1980 | Hametner et al. |
| 4,278,184 A | 7/1981 | Willis |
| 4,593,845 A | 6/1986 | Andersson et al. |
| 4,620,656 A | 11/1986 | McClay et al. |

(Continued)

FOREIGN PATENT DOCUMENTS

| | | |
|---|---|---|
| EP | 2384850 | 11/2011 |
| JP | 11-033500 A | 2/1999 |

(Continued)

OTHER PUBLICATIONS

PCT International Search Report dated Dec. 19, 2013 for corresponding International Application No. PCT/US2013/059232.

*Primary Examiner* — Robert Long
(74) *Attorney, Agent, or Firm* — Arent Fox LLP

(57) ABSTRACT

A method and a system for dispensing bolts are provided. The system includes a dispensing cartridge including a dispensing tube and a dispensing section. The dispensing tube includes a first end, a second end, and a passage provided between the first end and the second end. The passage is configured to store a plurality of bolts to be supplied to the dispensing tube through the first end such that the bolts are moved through the passage. The dispensing section is located near the second end of the dispensing tube and is configured to dispense the bolts one at a time from the second end.

15 Claims, 8 Drawing Sheets

(56) References Cited

U.S. PATENT DOCUMENTS

| | | | |
|---|---|---|---|
| 4,841,832 A * | 6/1989 | Snavely | B23P 19/004 173/93 |
| 4,898,316 A | 2/1990 | McLaughlin et al. | |
| 5,014,876 A | 5/1991 | Young et al. | |
| 5,098,003 A | 3/1992 | Young et al. | |
| 5,425,473 A | 6/1995 | Kvalheim | |
| 5,465,868 A | 11/1995 | Bonomi | |
| 5,733,089 A | 3/1998 | Albright | |
| 6,161,697 A * | 12/2000 | Van Laeken | F16B 27/00 206/499 |
| 6,196,414 B1 | 3/2001 | Ferenczi et al. | |
| 6,276,409 B1 | 8/2001 | Ellison | |
| 6,688,489 B2 * | 2/2004 | Bloch | B21J 15/32 221/88 |
| 6,729,523 B1 | 5/2004 | Wang et al. | |
| 6,837,414 B1 | 1/2005 | Chou | |
| 7,114,535 B2 | 10/2006 | Hartness et al. | |
| 7,331,156 B2 | 2/2008 | Hartness et al. | |
| 7,357,243 B2 | 4/2008 | Weaver et al. | |
| 8,046,898 B2 | 11/2011 | Bloch et al. | |
| 8,047,416 B2 | 11/2011 | Davies et al. | |
| 8,733,616 B2 * | 5/2014 | Bailly | A61B 17/064 227/179.1 |
| 8,789,446 B1 | 7/2014 | Sungkhaphong et al. | |
| 8,805,575 B1 | 8/2014 | Bloch et al. | |
| 2005/0006427 A1 | 1/2005 | Bloch et al. | |
| 2005/0240222 A1 | 10/2005 | Shipp | |
| 2006/0289597 A1 | 12/2006 | Bruins et al. | |
| 2007/0278276 A1 * | 12/2007 | Wen | B25C 1/00 227/130 |
| 2008/0022956 A1 | 1/2008 | Matsuura et al. | |
| 2008/0061103 A1 | 3/2008 | Kvalheim | |
| 2008/0245809 A1 * | 10/2008 | Fustel I Gascon | B21J 15/32 221/1 |
| 2011/0274232 A1 * | 11/2011 | Doll | B25J 5/02 376/260 |
| 2012/0053065 A1 | 3/2012 | Van Berkel et al. | |
| 2012/0248171 A1 | 10/2012 | Bailly et al. | |
| 2014/0076913 A1 * | 3/2014 | Neumeier | B65D 83/02 221/1 |
| 2014/0263386 A1 | 9/2014 | Neumeier et al. | |
| 2015/0275667 A1 * | 10/2015 | Comorge | E21D 20/006 405/259.5 |

FOREIGN PATENT DOCUMENTS

| | | |
|---|---|---|
| JP | 11-033844 A | 2/1999 |
| JP | 2005-246558 A | 9/2005 |
| WO | WO 2011/059966 A1 | 5/2011 |

* cited by examiner

HIGH SPEED BOLT DISPENSER

CROSS-REFERENCE TO RELATED APPLICATIONS

This application is a divisional application of U.S. patent application Ser. No. 13/618,254, filed Sep. 14, 2012. The disclosure of the priority application is incorporated its entirety herein by reference.

BACKGROUND

The present disclosure relates to methods and an apparatus for dispensing bolts and, more particularly, methods and systems for dispensing bolts into apertures formed on a work piece.

One manner of manufacturing a product in mass is through the use of an assembly line in which a work piece is moved through a number of stations and a specific set of components are mounted onto the work piece at each station. Such a manner of manufacturing involves moving the components from a feeder to the work piece at each station. While a single trip from the feeder to the work piece by an automated apparatus such as a robot may be sufficient to carry and mount one type of component on the work piece, it may not be possible to carry and mount a variety of components in a single trip, and thus using conventional manufacturing techniques, multiple trips may be necessary. For example, it may be difficult or impossible to configure the robot to carry and mount bolts or screws of different sizes or shapes onto the work piece efficiently in a single trip.

Thus, there is a need for a method and an apparatus allowing components of different sizes and shapes to be carried and mounted onto the work piece in a more efficient manner.

SUMMARY

In one example aspect, a system for dispensing bolts is provided. The system includes a dispensing cartridge including a dispensing tube and a dispensing section. The dispensing tube includes a first end, a second end, and a passage provided between the first end and the second end. The passage is configured to store a plurality of bolts to be supplied to the dispensing tube through the first end such that the bolts are moved through the passage. The dispensing section is located near the second end of the dispensing tube and is configured to dispense the bolts one at a time from the second end.

In another example aspect, a method of dispensing bolts into apertures formed on a work piece is provided. The method includes a step of providing a dispensing cartridge including a dispensing tube and a dispensing section. The dispensing section is configured to control opening and closing of an end of the dispensing section. The method further includes a step of filling the dispensing tube with a plurality of bolts by stacking the bolts on top of one another. The method further includes a step of dispensing the bolts one at a time from the dispensing tube into apertures formed on a work piece using the dispensing section.

In yet another example aspect, a method of dispensing bolts into apertures formed on a work piece is provided. The method includes a step of providing a first dispensing cartridge and a second dispensing cartridge. Each of the first dispensing cartridge and the second dispensing cartridge includes a dispensing tube and a dispensing section configured to control opening and closing of an end of the dispensing tube. The method further includes a step of filling the dispensing tube of the first dispensing cartridge with bolts. The method further includes a step of dispensing the bolts one at a time from the dispensing tube of the first dispensing cartridge into apertures formed on a work piece using the dispensing section of the first dispensing cartridge. The method further includes a step of filling the dispensing tube of the second dispensing cartridge with bolts.

In yet another example aspect, a method of dispensing bolts into apertures formed on a work piece is provided. The method includes a step of providing a dispensing cartridge including a dispensing tube and a dispensing section, the dispensing section configured to control opening and closing of an end of the dispensing tube. The method further includes a step of filling the dispensing tube with a plurality of bolts including a first bolt and a second bolt, the first bolt and the second bolt shaped differently from one another. The method further includes a step of dispensing the first bolt and the second bolt one at a time from the dispensing tube into apertures formed on a work piece using the dispensing section.

BRIEF DESCRIPTION OF THE DRAWINGS

These and other aspects are better understood when the following detailed description is read with reference to the accompanying drawings, in which.

DETAILED DESCRIPTION

Figure 1:
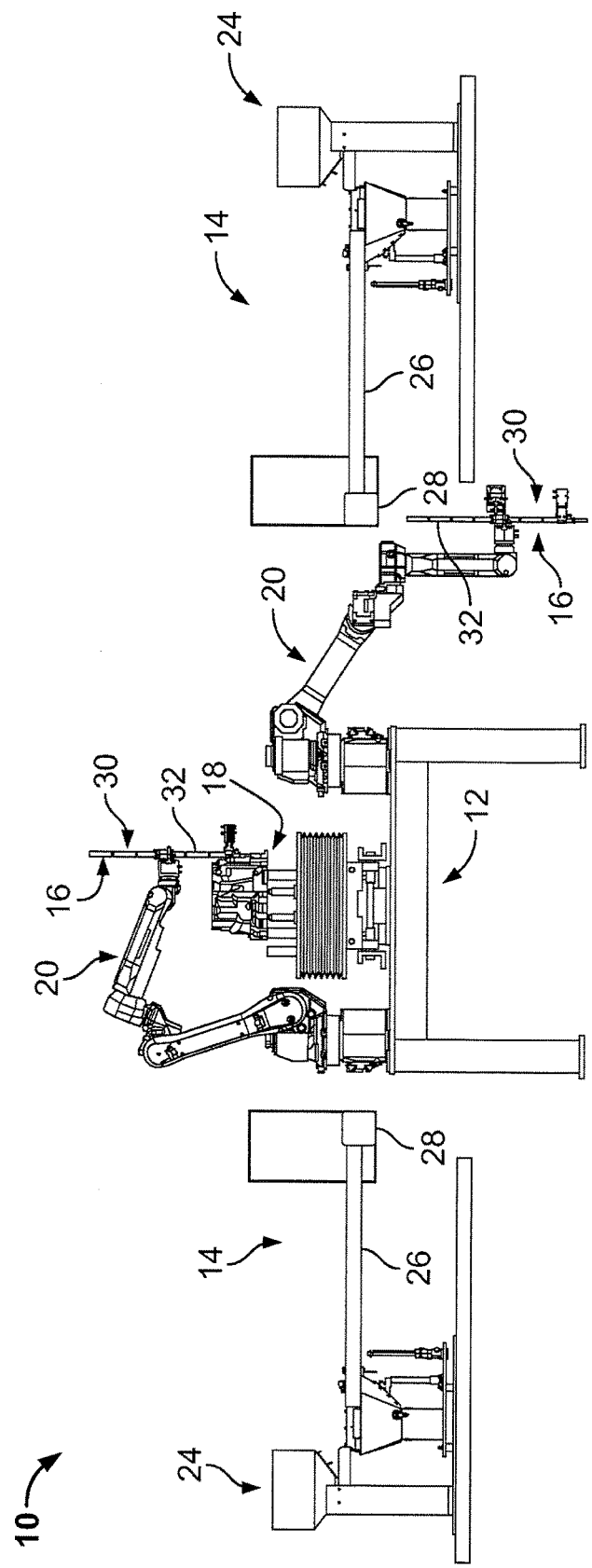
FIG. 1 is a side view of an example embodiment of a system for dispensing and mounting bolts onto a work piece.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 2:
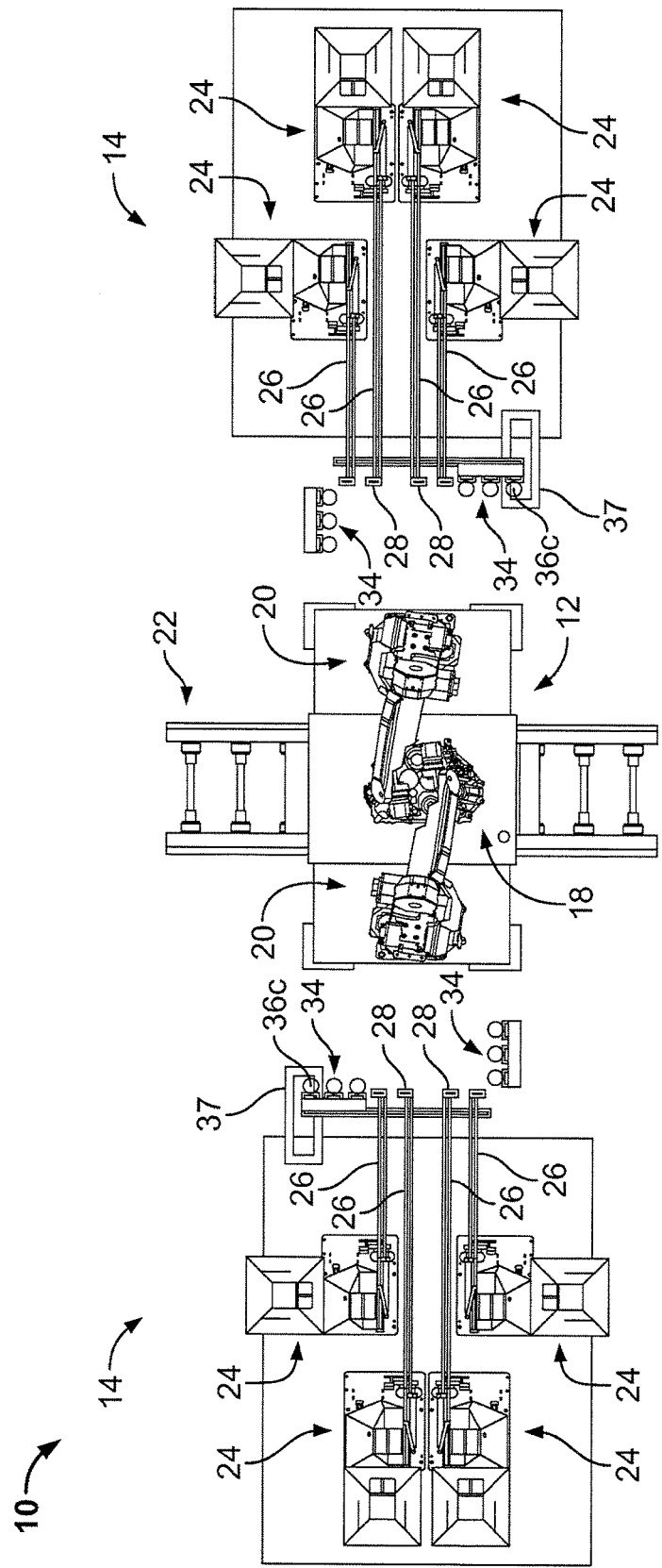
FIG. 2 is a top view of the example system in FIG. 1 with bolt loading stations, a conveying device, a holding device and robotic arms.

Referring now to FIGS. 1 and 2, an example embodiment of a system 10 is illustrated transporting bolts between a holding device 12 and one or more bolt loading stations 14 for dispensing bolts 16 onto a work piece 18 that is secured to the holding device 12. The term "bolt" in the present disclosure should be construed to include any type of fastener that includes a head and a cylinder that extends from the head and may or may not be externally threaded, among others.

In the example embodiment of FIGS. 1-2, the holding device 12 is provided with two robotic arms 20 each of which transports bolts 16 to the holding device 12 from the bolt loading stations 14 located laterally thereof. A different type of arrangement can also be contemplated and, for example, the number or arrangement of the robotic arms 20, the holding device 12 or the bolt loading stations 14 may vary. The holding device 12 may be embodied to include a chuck, a lathe or the like and may be mounted on a conveying device 22 (e.g., a conveyor, a rail or the like) by way of which the holding device 12 can be moved along an assembly line. The conveying device 22 may allow the holding device 12 to stop at discrete locations along the conveying device 22 and be brought in proximity with each bolt loading station 14 such that the work piece 18 secured by the holding device 12 may be worked on by a variety of apparatuses on the assembly line. Moreover, in this example embodiment, the system 10 further includes one or more robotic arms 20 which are configured in the example embodiment to move with the holding device 12 along the conveying device 22, although the robotic arms 20 may instead be mounted at fixed locations relative to the bolt loading stations 14. The robotic arm 20 may be embodied with members connected by one or more joints that allow for movement with various degrees of freedom similar to a human arm as conventionally known in the art.

As shown in FIGS. 1-2, the bolt loading stations 14 may supply the bolts 16 that are to be assembled to the work piece 18. The bolt loading stations 14 may be provided at various positions surrounding a holding device 12 that has come to a stop (e.g., one on a lateral side of the conveying device 22, one on each lateral side of the conveying device 22, two or more bolt loading stations 14 on a lateral side of the conveying device 22, two or more bolt loading stations 14 on each lateral side of the conveying device 22, etc.). Each bolt loading station 14 may include one or more bolt feeders 24 with each bolt feeder 24 supplying bolts 16 having a given set of dimensions such as a fixed diameter, length or the like. Each bolt feeder 24 may include a track 26 which leads to a hopper 28 from which the bolts 16 are fed to a dispensing cartridge 30 as will be described below.

Figure 4A:
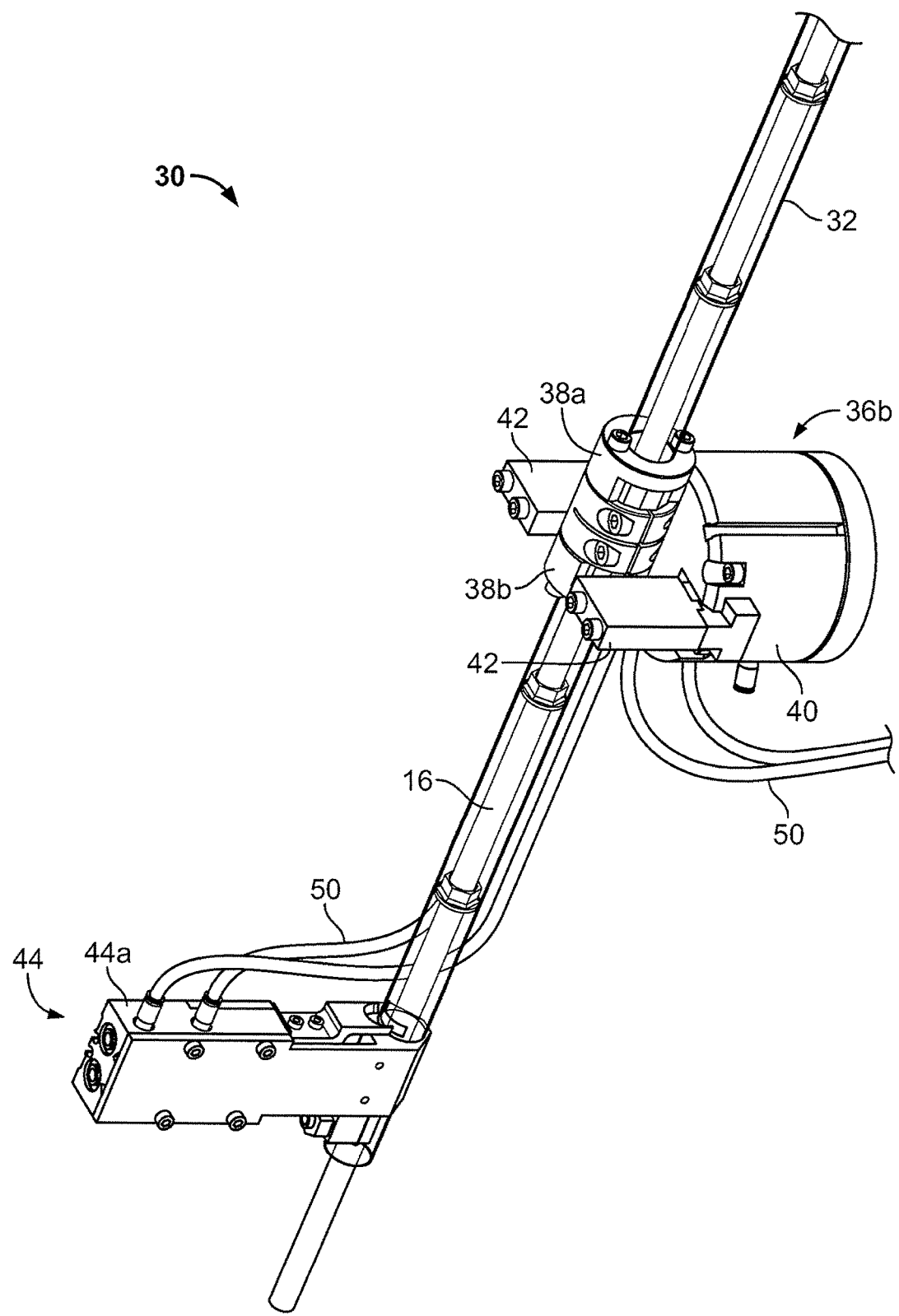
FIG. 4A is a close-up, isolated view of the dispensing cartridge held by a gripper.
Figure 4B:
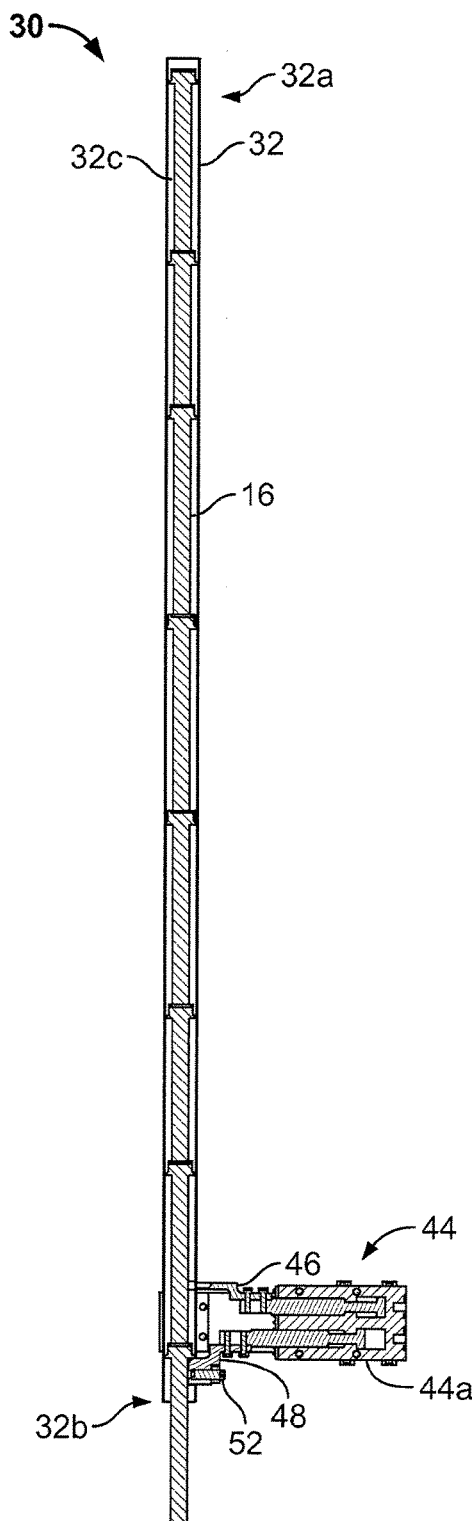
FIG. 4B is a cross-sectional view of the dispensing cartridge storing the bolts and including a dispensing section with a first member and a second member therein with the second member engaging a bolt.
Figure 4C:
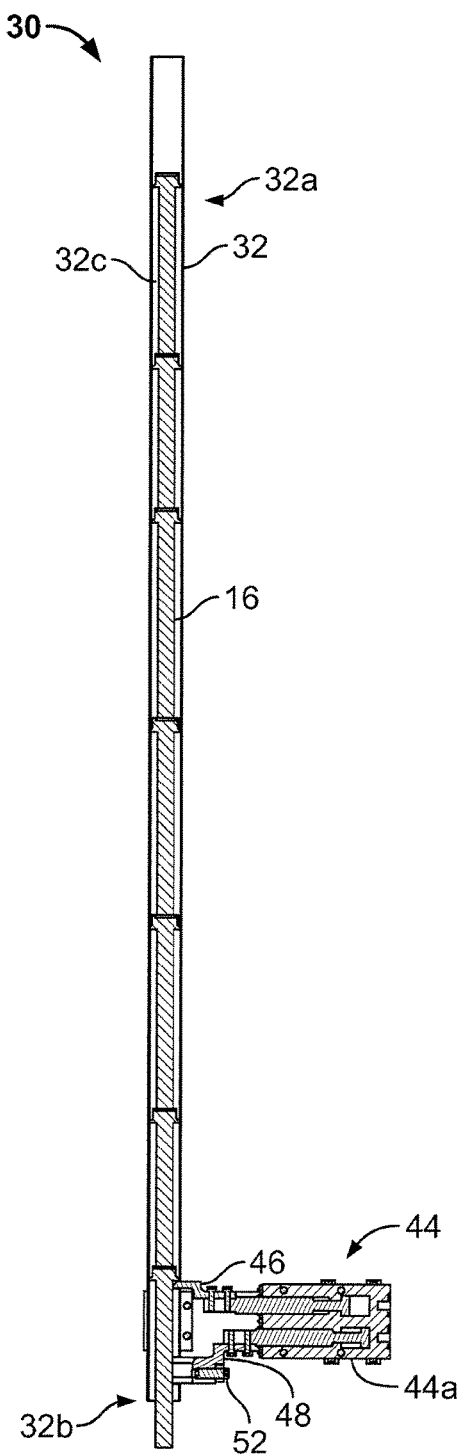
FIG. 4C is a cross-sectional view of the dispensing cartridge storing the bolts and including the dispensing section with a first member and a second member therein with the first member engaging a bolt.

As shown in the embodiment of FIG. 1, the system 10 further includes a dispensing cartridge 30 with a dispensing tube 32 that is loaded or filled with bolts 16. The dispensing cartridge 30 is transported by the robotic arm 20 between the bolt loading station 14 and the holding device 12. As shown in FIG. 4B-4C, the dispensing tube 32 functions as a container for the bolts 16 and includes a first end 32a, a second end 32b and a passage 32c provided between the two ends 32a, 32b. Although the dispensing tube 32 is shown in a transparent fashion in FIGS. 1 and 4B-4C in order to indicate the presence of bolts 16 inside the dispensing tube 32, the dispensing tube 32 need not be transparent. The dispensing cartridge 30 is filled with bolts 16 after the robotic arm 20 positions the first end 32a under the hopper 28 of one of the bolt feeders 24 and the bolts 16 are fed to the dispensing cartridge 30 and are dropped into the passage 32c through to the second end 32b. The bolts 16 may be stored inside the dispensing tube 32 by vertically stacking the bolts 16 on top of one another in the passage 32c such that the head of a bolt supports another bolt, as shown in FIG. 4B-4C.

Figure 3:
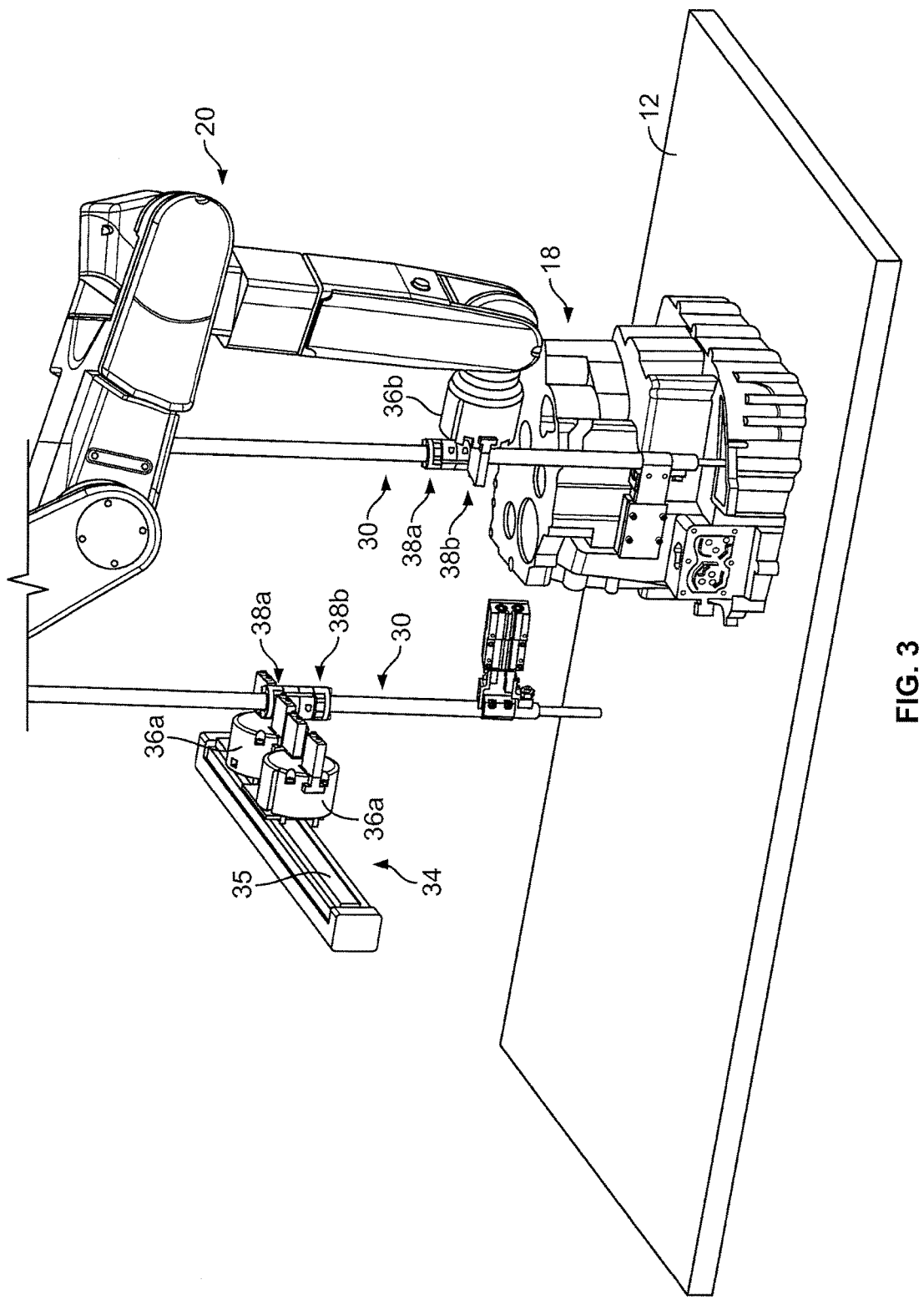
FIG. 3 is a perspective view of an example embodiment of the robotic arm transporting example embodiments of a dispensing cartridge around the work piece in order to dispense and mount bolts.

As shown in FIGS. 2-3, the bolt loading station 14 may include a dock 34 provided with one or more first grippers 36a that can grasp the dispensing cartridge 30 such that the dispensing cartridge 30 can be temporarily secured to the bolt loading station 14. In FIG. 3, only the dock 34 of the bolt loading station 14 is shown for clarity of illustration and a dispensing cartridge 30 is shown temporarily secured to the dock 34. As shown in FIGS. 3-4A, an end of the robotic arm 20 may also include a second gripper 36b that is similar to the first gripper 36a provided on the dock 34 of the bolt loading station 14. The dispensing cartridge 30 may include a first gripping section 38a and a second gripping section 38b that are configured to be engaged or grasped by the first gripper 36a of the dock 34 and the second gripper 36b of the robotic arm 20 respectively.

As shown in the embodiment of FIGS. 3-4A, the grippers 36a and 36b are similar in structure and include a cylindrically shaped main body 40 and two digits 42 that protrude from one of the bases of the main body 40. As shown in FIGS. 4A and 4D, the digits 42 are configured to move radially inward and outward about the base and thereby engage and disengage the first gripping section 38a (or 38b) of the dispensing cartridge 30. The movement of the digits 42 may be controlled pneumatically. As shown in the embodiment of FIG. 4D, each digit 42 is substantially box-shaped and includes a recessed section 42a which is shaped to mate with a projecting section 39 of the first gripping section 38a (or 38b) when the digits 42 grasp or engage the first gripping section 38a (or 38b).

As shown in FIGS. 4A-4C, the bolts 16 stored inside the passage 32c of the dispensing tube 32 may be dispensed from the dispensing cartridge 30 using a dispensing section 44 that is located near the second end 32b and controls the opening and closing of the dispensing cartridge 30 at the second end 32b. In this embodiment, the dispensing section 44 is an elongate, box-shaped component that extends in a radially outward direction from the dispensing tube 32.

As shown in FIGS. 4B-4C and 5A-5C, the dispensing section 44 may include a first member 46 and a second member 48 that are oriented to extend at least partially into the passage 32c of the dispensing cartridge 30 through apertures 32d, 32e formed near the second end 32b of the dispensing tube 32. The dispensing section 44 may include a mechanism by way of which each of the first member 46 and the second member 48 can alternate between a retracted position and an extended position. The mechanism may be operatively connected to gas lines 50 (shown in FIG. 4A) originating from the second gripping section 38b and may be pneumatically controlled by gas originating from the second gripper 36b. Also, the first member 46 includes a first distal 46a end and the second member 48 includes a second distal end 48a. In the extended position, the distal end 46a or 48a of either member 46 or 48 is positioned and oriented to extend sufficiently into the passage 32c of the dispensing tube 32 such that a part of the bolt 16 (e.g., the head) is caught by the distal end 46a or 48a and is prevented from passing through. In the retracted position, the member 46 or 48 may be substantially retracted into a housing 44a of the dispensing section 44 and may allow a bolt 16 to pass by the member 46 or 48.

As shown in FIG. 4B, the second distal end 48a of the second member 48 may extend into the passage 32c at a location nearer the second end 32b of the dispensing tube 32 and engage a bolt 16 nearest the second end 32b in the extended position. The first distal end 46a of the first member 46 may engage a bolt 16 that is second to nearest the second end 32b of the dispensing tube 32 in the extended position.

As shown in FIGS. 4B-4C, the first member 46 may be in the extended position when the second member 48 is in the retracted position and the first member 46 may be in the retracted position when the second member 48 is in the extended position. When the first member 46 is in the extended position and the second member 48 is the retracted position, the bolt 16 that is nearest the second end 32b of the dispensing tube 32 is the bolt 16 held and engaged by the first distal end 46a of the first member 46 because the bolt 16 that was nearest the second end 32b and was engaged by the second distal end 48a of the second member 48 has been released from the dispensing cartridge 30. As the first member 46 switches to the retracted position while the second member 48 moves to the extended position, the bolt 16 that was being held by the first distal end 46a of the first member 46 moves down but is caught and engaged by the second distal end 48a of the second member 48.

Figure 5A:
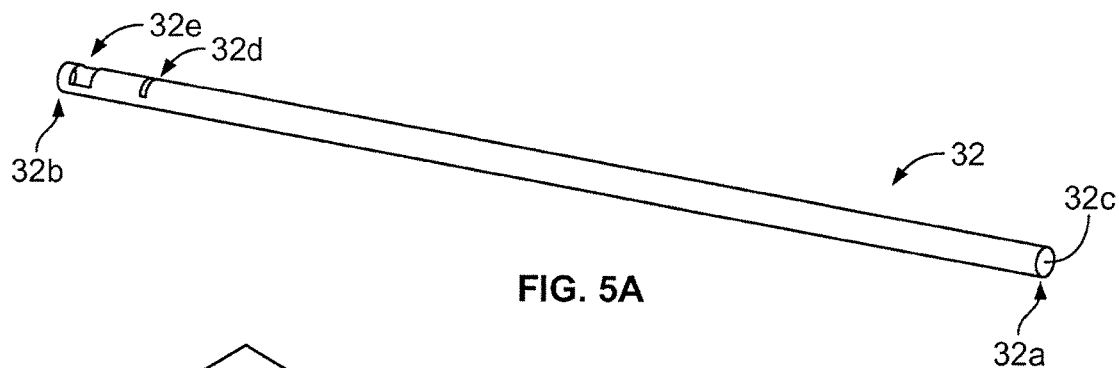
FIG. 5A is an isolated perspective view of a dispensing tube in the dispensing cartridge.
Figure 5B:
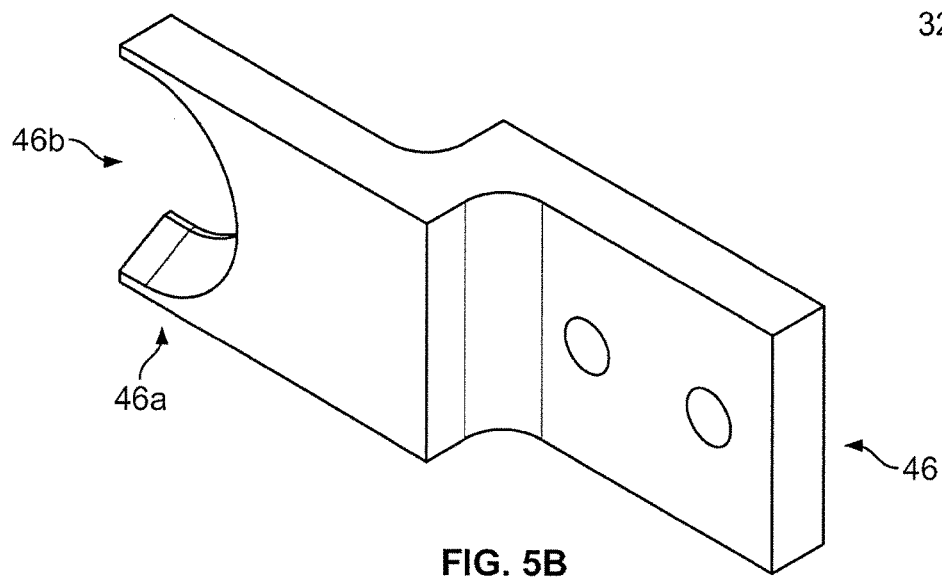
FIG. 5B is an isolated perspective view of the first member in the dispensing cartridge.
Figure 5C:
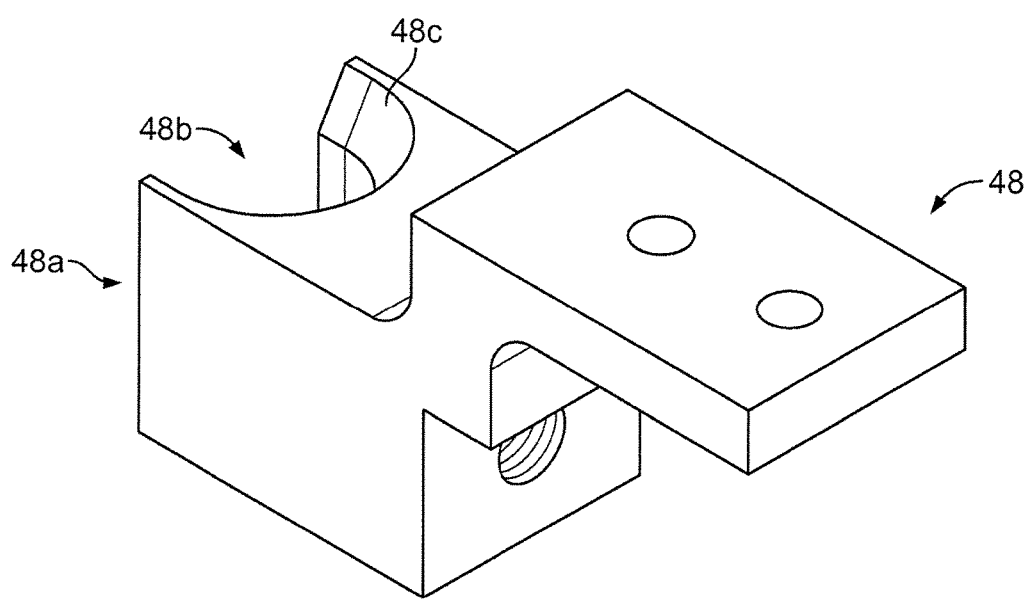
FIG. 5C is an isolated perspective view of the second member in the dispensing cartridge.

While the distal ends 46a, 48a may take on a variety of shapes, the distal ends 46a, 48a include a concavely semi-cylindrical indent 46b or 48b as shown in FIG. 5B and 5C. In the extended position of the members 46 or 48, the radius of curvature of the indent 46b or 48b is dimensioned to block and prevent the head of the bolt 16 from passing through while the cylinder of the bolt 16 can extend past through the indent 46b or 48b. As shown in the second member 48 in FIG. 5C, the indent 48b may also include an upper tapered section 48c that funnels the bolt 16 into the indent 48b and reduces the possibility of the cylinder of a bolt 16 not entering the indent 48b. As further shown in the second member 48 in FIG. 4B-4C, the member 48 may also include a magnet 52 adjacent the indent 48b to immobilize or keep the bolt 16 substantially still as the dispensing cartridge 30 is moved around the work piece 18 and the robotic arm 20 aligns the bolt 16 to be dispensed into an aperture.

As shown in FIG. 3, the first gripper 36a on the dock 34 is configured to simply grasp the first gripping section 38a whereas the second gripper 36b on the robotic arm 20 is configured to operatively control as well as grip the dispensing cartridge 30. Although the dock 34 may be stationary, the dock 34 may include a horizontally movable slide mechanism 35 such that the grippers 36a may be moved so that the first end 32a of the dispensing tube 32 can be positioned under any of the hoppers 28 in order to fill the dispensing tube 32 with a bolt 16 having the required dimensions.

Figure 4D:
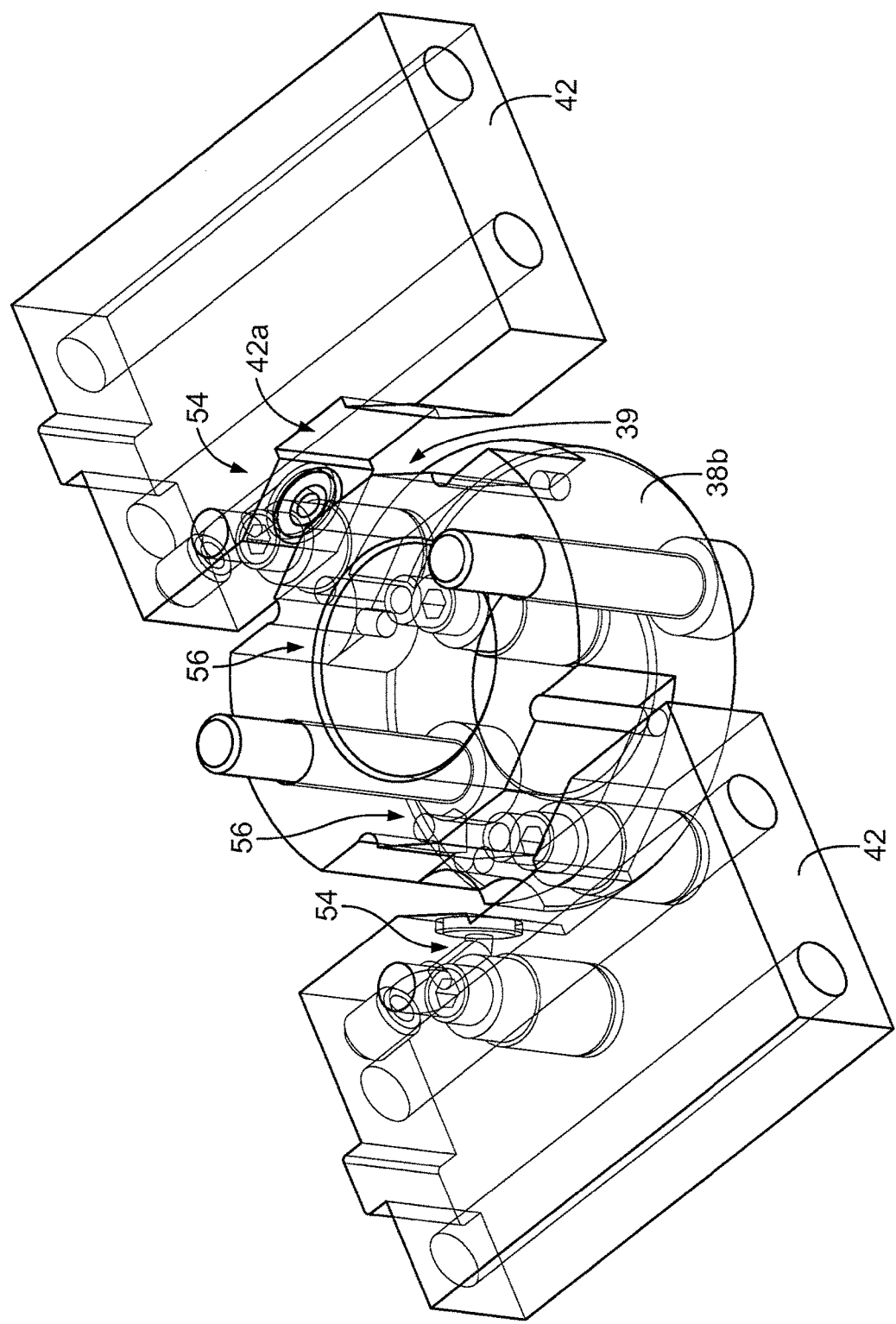
FIG. 4D is a close-up, phantom view of a gripping section on the dispensing cartridge and digits of a gripper that engage the gripping section.

The dispensing section 44 of the dispensing cartridge 30 may be controlled pneumatically as shown in FIG. 4D. Each digit 42 of the second gripper 36b of the robotic arm 20 may include a first gas channel 54 each of which is configured to establish gas communication with a second gas channel 56 in the second gripping section 38b once the second gripper 36b grasps the second gripping section 38b. As shown in FIG. 4A, the gas lines 50 run between the second gripping section 38b grasped by the second gripper 36b on the robotic arm 20 and the dispensing section 44 of the dispensing cartridge 30 that allow the first and second members 46, 48 to alternately extend into the passage 32c. There may be additional gas lines 50 running from the second gripper 36b to the robotic arm 20. Using the above configuration, the digits 42 of the gripper 36b may be pneumatically controlled by one solenoid and while movement of the members 46, 48 of the dispensing section 44 may be pneumatically controlled by another solenoid. Alternatively, electrical control could be utilized to generate movements of the first and second members 46, 48 in other embodiments.

Moreover, the dock 34 may include an emptying gripper 36c as shown in FIG. 2 for emptying the dispensing cartridge 30. After the robotic arm 20 transports the dispensing cartridge 30 to the emptying gripper 36c, the slide mechanism 35 (shown in FIG. 3) can move the second end 32b of the dispensing tube 32 over a trash bin 37 so that a dispensing tube 32 in which the bolts 16 are stacked in an incorrect order may be emptied into the trash bin 37. In this case, the emptying gripper 36c is configured with gas channels and to engage the second gripping section 38b so that gas communication is established with the dispensing section 44 similarly as between the second gripper 36b and the second gripping section 38b so that the emptying gripper 36c can pneumatically control the dispensing section 44 and empty the dispensing tube 32 into the trash bin 37.

In an example operation, the dispensing of the bolts 16 onto the work piece 18 by system 10 may occur as described in the following. The holding device 12 which transports the work piece 18 is brought to a stop next to one of the bolt loading stations 14 by the conveying device 22, as shown in FIGS. 1-2. One or more dispensing cartridges 30 are provided at the dock 34 of the bolt loading station 14 with the grippers 36a of the dock 34 grasping the first gripping sections 38a of the dispensing cartridges 30. The robotic arm 20 next to the holding device 12 can pick up the dispensing cartridges 30 by grasping the second gripping section 38b with the second gripper 36b at which point the first gripper 36a of the dock 34 releases the dispensing cartridge 30. Thereafter, the robotic arm 20 moves the dispensing cartridge 30 around the work piece 18 and dispenses the bolts 16 at apertures formed at different parts of the work piece 18. The dispensing of the bolts 16 is controlled pneumatically by the robotic arm 20 through the gas channels 54 and 56 and the gas lines 50 (shown in FIG. 4A) so that the members 46 and 48 (shown in FIGS. 4B-4C and 5B-5C) alternate between the extended position and the retracted position and release the bolts 16 one at a time into each aperture. The bolts 16 are moved and dispensed through the dispensing tube 32 entirely by way of gravity in this example. The robotic arm 20 may be configured with features such that the dispensing tube 32 being properly aligned about an aperture prior to dispensing a bolt 16. The order of apertures followed by the robotic arm 20 is predetermined and the bolts 16 are stacked inside the dispensing tube 32 in accordance with such an order at the bolt loading station 14 so that bolts of appropriate lengths are inserted in the proper apertures, as determined in advance or otherwise by computer command. It may also be possible for an assembly line worker to manipulate the dispensing cartridge 30 that is held by a device similar to the robotic arm 20 about the work piece 18.

Figure 6:
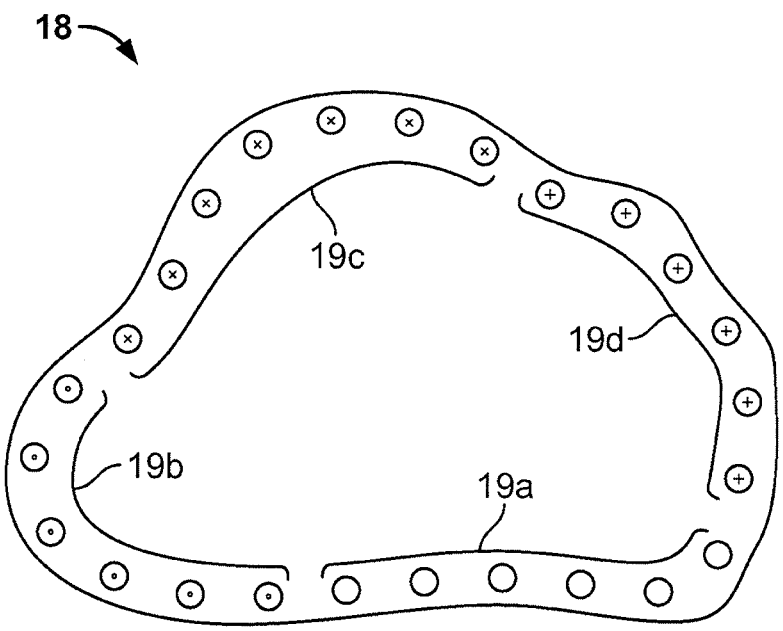
FIG. 6 is a top view of an example embodiment of the work piece including a variety of apertures into which bolts are dispensed.

As shown in FIG. 6, an example embodiment of the work piece 18 is shown to include a group of apertures 19a, 19b, 19c and 19d with each group capable of accommodating a particular bolt 16 of a given configuration. The different groups of apertures 19a, 19b, 19c and 19d are schematically distinguished from one another in FIG. 6 using "×", "+" and the like. The robotic arm 20 may be configured to move about the groups 19a, 19b, 19c and 19d in a first order that is programmable from a computer and to move about the apertures within a group in a second order that is programmable from the computer. The group of apertures 19a and the group of apertures 19b may be configured to accommodate bolts that are shaped differently from one another. For example, the bolts 16 may have lengths that are different from one another but have the same first diameter. Alternatively, the bolts 16 may differ in that the heads accommodate different types of screw drives (e.g., slot, Phillips, hex or the like). Similarly, the group of apertures 19c and the group of apertures 19d may be configured to accommodate bolts that have lengths different from one another but have the same second diameter. Accordingly, a first dispensing cartridge 30 may be filled with bolts 16 to be dispensed into groups of apertures 19a and 19b while a second dispensing cartridge 30 may be filled with bolts 16 to be dispensed into groups of apertures 19c and 19d. Thus, by providing two dispensing cartridges 30 in accordance with the first order and the second order by which the robotic arm 20 will move, bolts 16 of different lengths can be dispensed into the apertures of the work piece 18 in an efficient manner.

After the dispensing cartridge 30 has dispensed all of the bolts 16 in the passage 32c of the dispensing tube 32, the robotic arm 20 may obtain another dispensing cartridge 30 filled with bolts arranged in a variety of ways. In a first method, the robotic arm 20 returns the empty dispensing cartridge 30 back to the dock 34 where the second gripper 36b of the robotic arm 20 releases the dispensing cartridge 30 which is grasped by the first gripper 36a of the dock 34. The robotic arm 20 then grasps another dispensing cartridge 30 from another first gripper 36a on the dock 34 that was previously filled. The filling of the dispensing cartridge 30 may occur while the robotic aim 20 transports another dispensing cartridge 30 around the work piece 18. The dispensing cartridge 30 is filled through the slide mechanism 35 of the dock 34 which moves the first end 32a of the dispensing tube 32 under the hoppers 28 according to an order by which the robotic arm 20 will subsequently dispense the bolts 16 onto the work piece 18. As a result, the bolts 16 in the dispensing tube 32 are not necessarily equal in length, but may vary in length and type based on the desired need and desired installation order. Moreover, a dock 34 equipped with multiple grippers 36a and the slide mechanism 35 allows the dispensing of bolts 16 from a first dispensing cartridge 30 and the filling of bolts 16 into a second dispensing cartridge 30 to occur simultaneously at least during some duration of time.

In a second alternative method, the robotic arm 20 may transport a dispensing cartridge 30 under the hoppers 28 according to a desired order by which the robotic aim 20 will subsequently dispense the bolts 16 onto the work piece 18. In this case, there may be no need to provide the dock 34 with a slide mechanism 35 for filling the dispensing cartridge 30 with bolts. The dispensing cartridge 30 transported by the robotic arm 20 may be the same dispensing cartridge 30 that was previously transported around the work piece 18.

After the bolts 16 are inserted into appropriate apertures, the bolts 16 can be fastened about the work piece 18 by another device such as a robotic arm with a screw driving capability, or they can be fastened manually, if desired.

Figure 7:
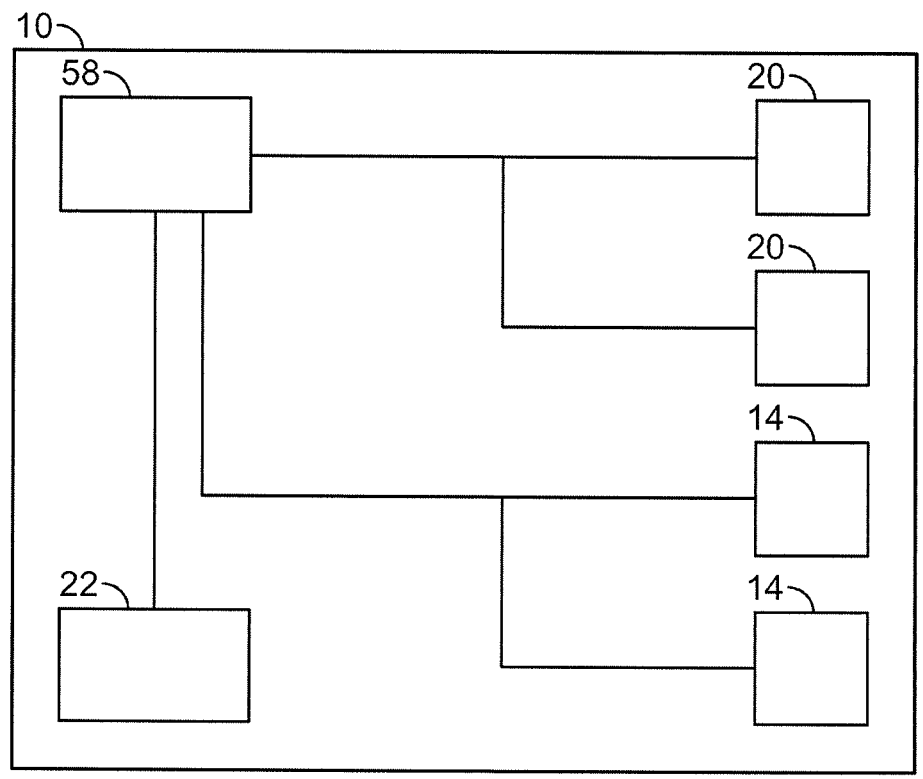
FIG. 7 is a schematic diagram of a controller for operating the system.

As shown in FIG. 7, the system 10 may include a control unit 58 (e.g., a computer) executing one or more programs to coordinate the operations of the robotic arms 20, the bolt loading stations 14, the conveying device 22 and other parts of the system 10. Based on information about the apertures formed on a work piece 18 and the desired order by which the robotic arms 20 will approach the apertures, the controller 58 may operate the bolt loading stations 14 according to its programming so that the dispensing cartridges 30 are filled in accordance with the desired order.

The system 10 is particularly adaptable because it allows bolts 16 of varying lengths to be carried from the bolt loading station 14 to the work piece 18 in a single trip. It is possible to provide at the dock 34 a second type of dispensing cartridge 30 with a passage 32c that has a diameter different from a first type of dispensing cartridge 30 so that bolts 16 of different types, such as with different diameters, lengths, pitches, and/or compositions, can be dispensed onto the work piece 18 by configuring the robotic arm 20 to grasp the second type of dispensing cartridge 30. As such, the inner diameter of the first type of dispensing cartridge 30 may be different from that of the second type of dispensing cartridge 30 so as to accommodate bolts of different dimensions (e.g., diameters) while the outer dimensions of the dispensing cartridges 30, including those of the gripping sections 38a, 38b, may remain the same. Alternatively, dispensing tubes 32 with smaller inner diameters may also be configured with smaller outer diameters thereby making the dispensing cartridge 30 more compact and increasing the ability of the dispensing cartridge 30 to access tight spaces near the apertures on the work piece 18. Even for these configurations, only the inner dimensions of the gripping section 38a, 38b would change and their outer dimensions would remain the same such that a gripper 36b with the same dimensions could be used.

Accordingly, these bolts 16 of different types can be provided and possibly assembled to the work piece 18 in a single stop thereby making the assembly of bolts 16 more efficient. Moreover, the size and geometry of the dispensing cartridge 30 is reduced such that the second end 32b of the dispensing tube 32 can approach the work piece 18 from a variety of angles and despite certain spatial restrictions.

It will be apparent to those skilled in the art that various modifications and variations can be made without departing from the spirit and scope of the claimed invention.

What is claimed is:

1. A method of dispensing bolts into apertures formed on a work piece, the method including steps of:
   providing a dispensing cartridge including a gripping section, a dispensing tube, and a dispensing section, the dispensing section configured to control opening and closing of an end of the dispensing tube, wherein the gripping section is configured to be engaged with or grasped by a first portion on a dock, or engaged with or grasped by a second portion on a robotic arm;
   filling the dispensing tube with a plurality of bolts by stacking the bolts on top of one another; and
   dispensing the bolts one at a time from the dispensing tube into apertures formed on a work piece using the dispensing section while the gripping section is engaged with or grasped by the second portion.

2. The method of claim 1, wherein the bolts inside the dispensing tube are not of equal length.

3. The method of claim 1, further including a step of transporting the dispensing cartridge, using the robotic arm, between
   a bolt loading station where the step of filling the dispensing tube occurs, and
   a holding device where the step of dispensing the bolts occurs, wherein the work piece is secured to the holding device.

4. The method of claim 3, wherein the bolts are stacked inside the dispensing tube according to an order of apertures by which the robotic arm is configured to transport the dispensing cartridge.

5. The method of claim 4, further including the step of emptying the dispensing cartridge in case the bolts are stacked in an incorrect order.

6. The method of claim 1, further including a step of fastening the bolts to the apertures.

7. The method of claim 1, wherein the bolts are dispensed into the apertures by way of gravity.

8. A method of dispensing bolts into apertures formed on a work piece, the method including steps of:
- providing a first dispensing cartridge and a second dispensing cartridge, each of the first dispensing cartridge and the second dispensing cartridge including a
- dispensing tube, a gripping section, and a dispensing section, wherein the dispensing section is configured to control opening and closing of an end of the dispensing tube;
- filling the dispensing tube of the first dispensing cartridge with bolts;
- filling the dispensing tube of the second dispensing cartridge with bolts; selecting the first dispensing cartridge using a robot; and
- using the robot for dispensing the bolts one at a time from the end of the dispensing tube of the first dispensing cartridge into apertures formed on a work piece using the dispensing section of the first dispensing cartridge.

9. The method of claim 8, wherein the step of dispensing the first dispensing cartridge and the step of filling the dispensing tube of the second dispensing cartridge occur at least in part simultaneously.

10. The method of claim 8, wherein the bolts in the first dispensing cartridge are different in diameter from the bolts in the second dispensing cartridge.

11. The method of claim 8, further comprising the steps of:
- selecting the second dispensing cartridge using the robot; and
- dispensing the bolts one at a time from the end of the dispensing tube of the second
- dispensing cartridge into apertures formed on the work piece or another work piece using the dispensing section of the second dispensing cartridge.

12. The method of claim 1, wherein the dispensing tube is filled with said plurality of bolts when the gripping section is engaged with or grasped by the first portion; and
- the bolts are dispensed one at a time from the dispensing tube into the apertures formed in the work piece when the gripping section is engaged with or grasped by the second portion.

13. The method of claim 1, wherein the dispensing tube is filled with said plurality of bolts when the gripping section is engaged with or grasped by the first portion.

14. The method of claim 8, wherein the gripping section is configured to be engaged with or grasped by the robot, wherein selecting the first dispensing cartridge using the robot further comprises:
- grasping or engaging the gripping section of the first dispensing cartridge with a first portion of the robot.

15. The method of claim 14, wherein filling the dispensing tube of the first and second dispensing cartridge with bolts further comprises:
- grasping or engaging the gripping section of the first dispensing cartridge and the second dispensing cartridge with a portion of a dock.

* * * * *